(12) United States Patent
Date

(10) Patent No.: US 7,362,471 B2
(45) Date of Patent: Apr. 22, 2008

(54) IMAGE-FORMING CONTROLLER, METHOD THEREFOR, PROGRAM, AND STORAGE MEDIUM

(75) Inventor: Atsushi Date, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 970 days.

(21) Appl. No.: 10/671,364

(22) Filed: Sep. 24, 2003

(65) Prior Publication Data

US 2004/0061901 A1     Apr. 1, 2004

(30) Foreign Application Priority Data

Sep. 30, 2002     (JP)     ............................. 2002-285657

(51) Int. Cl.
*H04N 1/40*     (2006.01)
*G06K 15/00*     (2006.01)

(52) U.S. Cl. ................ 358/2.1; 358/1.1; 358/1.9; 358/1.11; 358/1.12; 358/1.13; 358/1.14; 358/1.15; 358/1.4; 358/1.8; 358/3.23; 358/426.04; 358/539; 358/1.16; 358/1.18; 358/1.17; 382/166; 382/232; 382/250; 382/251; 382/176

(58) Field of Classification Search ................ 358/2.1, 358/1.15, 1.13, 1.1–1.18, 3.23, 539, 426.04, 358/1.9, 1.11, 1.14; 382/166, 232, 251, 176, 382/250
See application file for complete search history.

(56) References Cited

U.S. PATENT DOCUMENTS

| | | | | |
|---|---|---|---|---|
| 6,160,916 | A * | 12/2000 | Horiuchi ...................... | 382/232 |
| 6,775,245 | B1 * | 8/2004 | Ishida et al. ................ | 370/257 |
| 6,985,246 | B2 * | 1/2006 | Utsunomiya ............... | 358/1.15 |
| 7,043,077 | B2 * | 5/2006 | Rijavec ....................... | 382/164 |
| 7,130,072 | B2 * | 10/2006 | Suzuki et al. .............. | 358/1.15 |
| 2001/0033392 | A1 * | 10/2001 | Utsunomiya ............... | 358/1.15 |
| 2002/0061140 | A1 * | 5/2002 | Kajiwara .................... | 382/233 |
| 2002/0105676 | A1 * | 8/2002 | Fujiwara et al. ........... | 358/1.15 |
| 2003/0090709 | A1 * | 5/2003 | Rijavec ...................... | 358/1.15 |
| 2003/0151759 | A1 * | 8/2003 | Suzuki et al. .............. | 358/1.13 |

* cited by examiner

*Primary Examiner*—Twyler Lamb
*Assistant Examiner*—Pawandeep S Dhingra
(74) *Attorney, Agent, or Firm*—Canon U.S.A., Inc., IP Division

(57) ABSTRACT

A controller for a four-drum printer eliminates a need for an expensive inter-drum delay memory, which has been conventionally used, to print an RGB image and allows a multifunction machine, printer, and the like to be provided at low cost. An image ring interface reads an image data containing the same tile, which is stored in a tile pattern in a RAM, four times with a delay corresponding to a delay (10 lines of tiles) of image formation between image forming sections, and sequentially transfers the image data to four image output interfaces.

12 Claims, 13 Drawing Sheets

FIG. 12

RECORDING MEDIUM, SUCH AS FD/CD-ROM

| DIRECTORY INFORMATION |
|---|
| FIRST DATA-PROCESSING PROGRAM PROGRAM-CODE SET CORRESPONDING TO STEPS IN FLOW CHARTS SHOWN IN FIGS. 9 TO 11 |
|  |

MEMORY MAP OF RECORDING MEDIUM

—Prior Art—

IMAGE-FORMING CONTROLLER, METHOD THEREFOR, PROGRAM, AND STORAGE MEDIUM

BACKGROUND OF THE INVENTION

1. Field of the Invention

The present invention relates to an image-forming controller, a method therefor, a program, and a storage medium.

2. Description of the Related Art

Conventionally, a controller for a multifunctional image processing apparatus (multifunction machine) has been proposed and has a configuration in which raster images after being scanned or rendered are converted into rectangular images, which are then stored, so that the rectangular images can be transferred to rectangle-raster converting means and can be output to a printer as needed.

FIG. 13 is a schematic diagram showing one example of a rectangular-image transfer sequence of a controller for a conventional multifunctional image processing apparatus.

As shown in FIG. 13, in the conventional approach, a page is divided into a plurality of rectangular images (tiles), and a set of an X-coordinate number and a Y-coordinate number is attached to each rectangular image to serve as a tile number.

In FIG. 13, reference numeral 101 indicates a page, and 102 indicates a first tile, which has tile number (0, 0), in the page 101. Also, a second tile 103 has tile number (1, 0) and the last tile 105 in the first line has tile number (90, 0). Further, the first tile 104 in the second line has tile number (0, 1).

In the conventional system, these tiles are sequentially read in the order of (0, 0)→(1, 0)→(2, 0)→ . . . →(89, 0)→(90, 0)→(0, 1)→(1, 1)→ . . . →(2, 3)→(3, 3)→ . . . and so on from a memory, are transferred to an image output interface, and are converted into raster images by a rater-image processing section. Subsequently, the raster images are converted by a printer image-processing unit into YMCK images, which are then transmitted to a printer.

With respect to a unit ID indicating a transfer destination, unit ID "0" indicating an image output interface is attached to every data packet for transmission to an image ring.

However, when the controller for a multifunction machine in the above conventional example is connected to a printer engine that has a plurality of image forming sections and a plurality of photoreceptors for respective colors and that prints each page using the photoreceptors simultaneously at a high speed, time delay occurs after, for example, an RGB image is converted into a YMCK image, because timing of outputting image data in synchronization with the timing of a sheet of paper passing by photosensitive drums, arranged in parallel, varies for each color. Thus, the printer image-processing unit needs to include an inter-drum delay memory for storing data for the time delay. As a result, there is difficulty in providing a machine that incorporates a printer engine having a plurality of image forming sections at low cost.

SUMMARY OF THE INVENTION

The present invention has been made to overcome the foregoing problem, and an object of the present invention is to provide an image-forming controller, a method therefor, a program, and a storage medium, which are used for a printer engine having a plurality of image forming sections, without the use of an expensive inter-drum delay memory that has been conventionally used. This is achieved by a configuration in which image data containing an identical tile image stored in a memory in a divided tile pattern is read predetermined multiple times with a delay corresponding to the number of pieces of data corresponding to a delay (lines of tiles) of image formation between image forming sections and is sequentially transferred to rectangle-raster converting means. This allows tile data to be transferred to image output interfaces multiple times in synchronization with data-request timings for corresponding photosensitive drums of a printer engine having image forming sections.

According to a first aspect of the present invention, there is provided an image-forming controller for an image forming apparatus. In the image forming apparatus, a plurality of image forming sections is arranged in parallel for respective predetermined color components (YMCK) to sequentially form images on a recording medium sequentially passing by the image forming sections. The image-forming controller outputs raster image data for the predetermined color components to the corresponding image forming sections, thereby allowing a multi-color image to be formed. The image-forming controller includes raster-rectangle converting means (a tile generator 2061 shown in FIG. 1) for converting raster image data for a predetermined color-space (RGB color space) constituted by color components different from the predetermined color components into a plurality of pieces of rectangular image data and storing means (a RAM 2002 shown in FIG. 1) for storing the plurality of pieces of rectangular image data converted by the raster-rectangle converting means. The image-forming controller further includes a plurality of rectangle-raster converting means (image output interfaces "0 to 3" 2113, 2151, 2152, and 2153 shown in FIG. 2), provided for the respective predetermined color components, for converting the plurality of pieces of rectangular image data into raster image data. The image-forming controller further includes transferring means (a packet DMA circuit, not shown, in a first image ring interface 2147 shown in FIG. 1) for reading, predetermined multiple times, identical rectangular image data stored by the storing means and for sequentially transferring the read identical rectangular image data to the rectangle-raster converting means. The image-forming controller further includes a plurality of color-space converting means (printer image processing units "0 to 3" 2115, 2154, 2155, and 2156 shown in FIG. 2), provided for the respective color components, for converting the raster image data converted by the rectangle-raster converting means into a color-space constituted by the predetermined color components to generate respective pieces of raster image data for the predetermined color components and for outputting the pieces of raster image data to the corresponding image forming sections for the predetermined color components.

According to the present invention, it is possible to provide an inexpensive controller that eliminates the need for an expensive inter-drum delay memory, which has been conventionally used for printing an RGB image, thus offering advantages in that a multifunction machine, a printer, and the like having a plurality of drums can be provided at low cost.

Preferably, the transferring means (the packet DMA circuit, not shown, in the first image ring interface 2147) reads, the predetermined multiple times, the identical rectangular image data stored by the storing means with a delay corresponding to a predetermined number of pieces of data (e.g., 10 lines of tiles) and sequentially transfers the read identical rectangular image data to the corresponding rectangle-raster converting means.

Preferably, the image-forming controller further includes numeric-value setting means (a numeric-value register, not shown, in the first image ring interface 2147 shown in FIG. 1) for setting a numeric value corresponding to the predetermined number of pieces of data. Preferably, the transferring means (the packet DMA circuit, not shown, in the first image ring interface 2147 shown in FIG. 1) reads the identical rectangular image data the predetermined multiple times with a delay corresponding to the number of pieces of data corresponding to the numeric value set by the numeric-value setting means, the identical rectangular image data being stored by the storing means, and sequentially transfers the read identical rectangular image data to the corresponding rectangle-raster converting means.

Preferably, the predetermined number of pieces of data (e.g., 10 lines of tiles) is based on an arrangement interval (e.g., 100 mm) of the image forming sections.

Preferably, the predetermined number of pieces of data corresponds to a delay (e.g., 10 lines of tiles) of image formation between the image forming sections.

The predetermined color components may be yellow (Y), magenta (M), cyan (C), and black (K) color components or yellow (Y), magenta (M), and cyan (C) color components, and the predetermined color-space may be an RGB color-space constituted by red (R), green (G), and blue (B) color components. The color-space converting means converts RGB-color-space raster image data converted by the rectangle-raster converting means into a YMCK color-space or a YMC color-space constituted by the predetermined color components to generate raster image data for the respective predetermined color components and outputs the raster image data to the image forming sections for the predetermined color components.

Preferably, the image-forming controller further includes data-packet generating means (a CPU 2001 and the first image ring interface 2147 which are shown in FIG. 1) for generating data packets (shown in FIG. 4) containing rectangular image data (image data 3002 shown in FIG. 4 for each tile) converted by the raster-rectangle converting means, a page identification (an ID 3007 shown in FIG. 4), a rectangular-image number identification (a tile Y-coordinate 3009 and a tile X-coordinate 3010 shown in FIG. 4), and a transfer-destination identification (a unit ID 3019 shown in FIG. 4) indicating one of the rectangle-raster converting means. The storing means stores, as data packets generated by the generating means, the plurality of pieces of rectangular image data converted by the raster-rectangle converting means, and the transferring means reads a data packet containing the identical rectangular image data the predetermined multiple times, the identical rectangular image data being stored by the storing means and sequentially transfers the data packet to the rectangle-raster converting means.

According to a second aspect of the present invention, there is provided a method for an image-forming controller for an image-forming apparatus. In the image forming apparatus, a plurality of image forming sections are arranged in parallel for respective predetermined color components to sequentially form images on a recording medium sequentially passing by the image forming sections. The image-forming controller outputs raster image data for the predetermined color components to the corresponding image forming sections, thereby allowing a multi-color image to be formed. The image-forming controller includes raster-rectangle converting means for converting raster image data for a predetermined color-space constituted by color components different from the predetermined color components into a plurality of pieces of rectangular image data and storing means for storing the plurality of pieces of rectangular image data converted by the raster-rectangle converting means. The image-forming controller further includes a plurality of rectangle-raster converting mean, provided for the respective predetermined color components, for converting the plurality of pieces of rectangular image data into raster image data. The image-forming controller further includes a plurality of color-space converting means, provided for the respective color components, for converting the raster image data converted by the rectangle-raster converting means into a color-space constituted by the predetermined color components to generate respective pieces of raster image data for the predetermined color components and for outputting the pieces of raster image data to the corresponding image forming sections for the predetermined color components. The method for the image-forming controller includes a step (steps S101 to S127 in FIGS. 9 to 11) of reading identical rectangular image data predetermined multiple times, the identical rectangular image data being stored by the storing means, and sequentially transferring the read identical rectangular image data to the rectangle-raster converting means.

According to a third aspect of the present invention, there is provided a program for executing the method for the image-forming controller.

According to a fourth aspect of the present invention, there is provided a storage medium in which the program is stored so as to be readable by a computer.

Further objects, features and advantages of the present invention will become apparent from the following description of the preferred embodiment with reference to the attached drawings.

BRIEF DESCRIPTION OF THE DRAWINGS

FIG. 12 illustrates a memory map of a storage medium that stores a program for various types of data processing, the program being readable by the multifunctional image processing apparatus according to the present invention.

DESCRIPTION OF THE PREFERRED EMBODIMENT

The present invention is directed to a controller for a multifunction machine that has a CPU, memory, computer connection interface, network interface, printer interface, scanner interface, PDL rendering means, various-still-image processing means, and the like, and that performs scanning, printing, network transferring of image data, rendering of PDL (page description language) data (compiling of PDL data), storing of images, and the like. The configuration and operation of a multifunctional image processing apparatus of the present invention will be described below in detail.

Hardware

First, the overall configuration of hardware will be described with reference to FIGS. 1 and 2.

Figure 1:
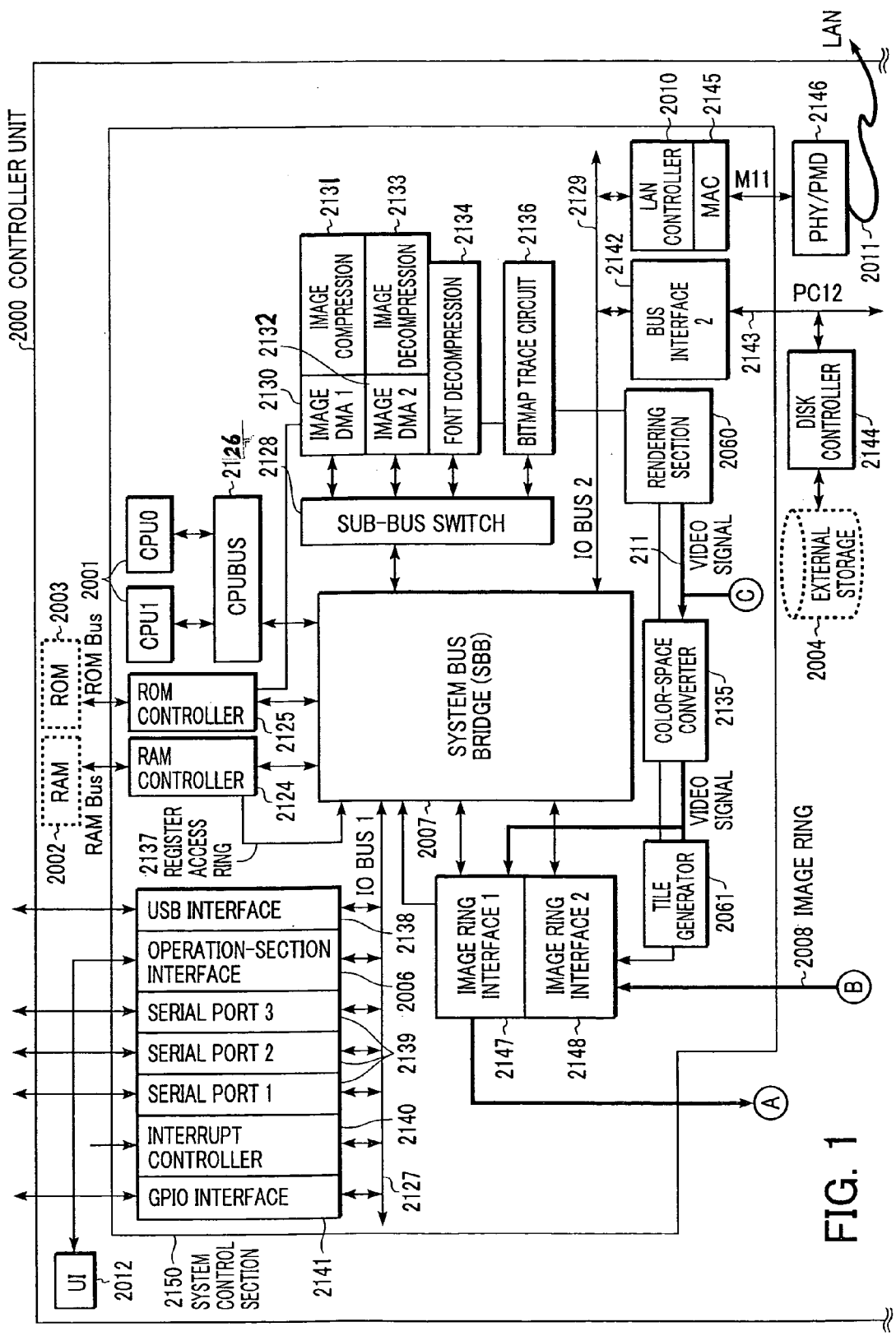
FIG. 1 is a block diagram of the configuration of a multifunctional image processing apparatus of the present invention.
Figure 2:
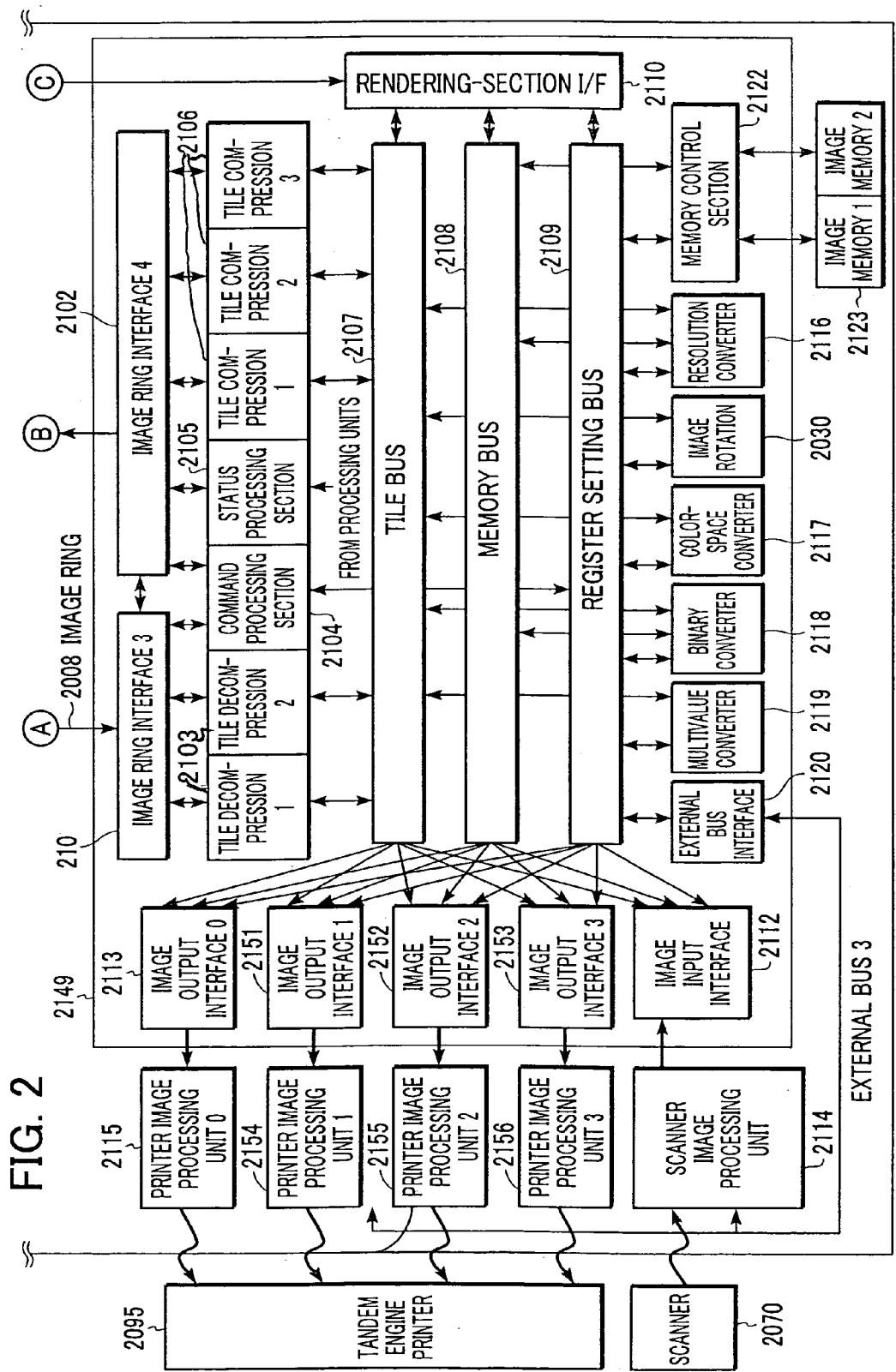
FIG. 2 is a block diagram of the configuration of the multifunctional image processing apparatus of the present invention.

FIGS. 1 and 2 are block diagrams showing the configuration of a multifunctional image processing apparatus according to an embodiment of the present invention.

Referring to the figures, a system controller unit 2000 is connected to a scanner 2070, which is an image input apparatus, and a tandem engine printer (hereinafter simply referred to as a "printer") 2095, which is an image output apparatus. The controller unit 2000 is also connected to a LAN (local area network) 2011 employing Ethernet (registered trademark) or the like to input and output image information and device information and to expand PDL data into images.

In the controller unit 2000, reference numeral 2150 indicates a system controlling section.

Reference numeral 2001 indicates CPUs (central processing units) for controlling the entire system. The present embodiment illustrates an example in which two CPUs (CPU 0 and CPU 1) are used as the CPUs 2001. These two CPUs (CPU 0 and CPU 1) 2001 are connected to a common CPU bus 2126, which is, in turn, connected to a system bus bridge (SBB) 2007. Hereinafter, the two CPUs will simply be referred as a "CPU 2001". Although two CPUs are used in the present embodiment, one CPU may be used.

The system bus bridge (SBB) 2007 is a bus switch and is connected to a RAM controller 2124, a ROM controller 2125, a first input/output (I/O) bus 2127, a second I/O bus 2129, a first image ring interface 2147, a second image ring interface 2148, and a sub-bus switch 2128, as well as the CPU bus 2126.

A RAM 2002 is a system working memory for the operation of the CPU 2001 and is also an image memory for temporarily storing image data. The RAM controller 2124 controls the RAM 2002.

A ROM 2003 serves as a boot RAM in which a system boot program is stored, and is controlled by the ROM controller 2125.

The sub-bus switch 2128 is connected to an image compression section 2131 via a first image DMA (direct memory access) section 2130 and to an image decompression section 2133 via a second image DMA section 2132. The sub-bus switch 2128 is also connected to a font decompression section 2134 and a bitmap trace circuit 2136.

The first I/O bus 2127 is one type of internal I/O bus and is connected to a standard-USB-bus controller, a USB interface 2138, an operation-section interface (operation-section I/F) 2006, first to third general-purpose serial ports 2139, an interrupt controller 2140, and a GPIO (general purpose input/output) interface 2141. The first I/O bus 2127 includes a bus arbiter, which is not shown.

An operation-section I/F 2006 is an interface for an operation section (UI) 2012 and outputs, to the operation section 2012, image data to be displayed thereat.

The operation-section I/F 2006 also serves to transmit information, entered by a user of the system from the operation section 2012, to the CPU 2001.

The second I/O bus 2129 is one type of internal I/O bus and is connected to a rendering section 2060, a first general-purpose bus interface (not shown), a second general-purpose bus interface 2142, and a LAN controller 2010. The second I/O bus 2129 also includes a bus arbiter, which is not shown.

The first general-purpose bus interface (not shown) and the second general-purpose bus interface 2142 are bus bridges that support standard I/O buses. The present embodiment illustrates a case in which PCI (peripheral component interconnect) buses are employed, and thus the second general-purpose bus interface 2142 is connected to a second PCI bus 2143.

An external storage device (a hard disk drive: HDD) 2004 stores system software, image data, and the like. The HDD 2004 is connected to the second PCI bus 2143 via a disk controller 2144.

The LAN controller 2010 is connected to the LAN 2011 via a media access controller (MAC) circuit 2145 and a PHY/PMD (physical layer protocol/physical medium dependent) circuit 2146 to input and output information.

The first image ring interface 2147 and the second image ring interface 2148 are connected between the system bus bridge 2007 and an image ring 2008, which transfers image data at a high speed, and serve as a DMA controller for transferring data compressed after being converted into tiles between the RAM 2002 and an image processing section 2149.

The image ring 2008 is constituted by a combination of a pair of unidirectional connection paths (a first image ring and a second image ring). In the image processing section 2149, the image ring 2008 is connected to a tile bus 2107, a memory bus 2108, and a register setting bus 2109 via a third image ring interface 2101, a rectangular-data interface (a fourth image ring interface) 2102 and further via first and second tile decompression sections 2103, a command processing section 2104, a status processing section 2105, first to third tile compression sections 2106, and the like. The tile bus 2107, the memory bus 2108, and the register setting bus 2109 are further connected to an image output interface "0" 2113, an image output interface "1" 2151, an image output interface "2" 2152, an image output interface "3" 2153, and an image input interface 2112. The present embodiment illustrates a case in which two (the first and second) tile decompression sections 2103 and three (the first to third) tile compression sections 2106 are incorporated.

The first and second tile decompression sections 2103 are connected between the third image ring interface 2101 and the tile bus 2107, to serve as bus bridges for decompressing compressed image data input via the image ring 2008 and for transferring the decompressed image data to the tile bus 2107.

The present embodiment illustrates a case in which a JPEG (Joint Photographic Experts Group) decompression algorithm is employed for multivalued data and a PackBits decompression algorithm is employed for binary data.

The first to third tile compression sections 2106 are connected between the fourth image ring interface 2102 and the tile bus 2107, to serve as bus bridges for compressing uncompressed image data input from the tile bus 2107 and for transferring the compressed image data to the image ring 2008.

The present embodiment illustrates a case in which a JPEG compression algorithm is employed for multivalued data and a PackBits compression algorithm is employed for binary data.

The command processing section 2104 is connected to the image ring 2008 and also to the register setting bus 2109 to write a register setting request, issued by the CPU 2001 and input via the image ring 2008, to a corresponding block connected to the register setting bus 2109. In accordance with a register reading request issued by the CPU 2001, the command processing section 2104 also reads information from a corresponding register via the register setting bus 2109 and transfers the read information to the fourth image ring interface 2102.

The status processing section 2105 monitors information in each image processing unit to generate an interrupt packet for issuing an interrupt to the CPU 2001 and outputs the interrupt packet to the fourth image ring interface 2102.

In addition to the above-described blocks, i.e., the image input interface 2112, the image output interface "0" 2113, the image output interface "1" 2151, the image output interface "2" 2152, and the image output interface "3" 2153, the tile bus 2107 is connected to other functional blocks, namely, a rendering-section interface 2110, a multivalue converter 2119, a binary converter 2118, a color-space converter 2117, an image rotation section 2030, and a resolution converter 2116.

The rendering-section interface 2110 is an interface through which a bitmap image generated by the rendering section 2060, which is described below, can be input. A general video signal 211 is transferred between the rendering section 2060 and the rendering-section interface 2110. The rendering-section interface 2110 is also connected to the memory bus 2108 and the register setting bus 2109 as well as the tile bus 2107. The rendering-section interface 2110 converts the structure of an input raster image into rectangular data by a predetermined method, the data structure being set through the register setting bus 2109. At the same time, the rendering-section interface 2110 can perform clock synchronization and can output the resulting rectangular data to the tile bus 2107.

The image input interface 2112 receives raster image data (described below) that has been subjected to image correction processing by a scanner image processing section 2114. The image input interface 2112 converts the structure of the raster image data into rectangular data by a predetermined method, the data structure being set through the register setting bus 2109, performs clock synchronization, and outputs the resulting rectangular data to the tile bus 2107.

Each of the image output interfaces "0 to 3" 2113, 2151, 2152, and 2153 receives the rectangular data from the tile bus 2107, converts the structure thereof into a raster image, changes the clock rate, and outputs the raster image to corresponding printer image processing units. As described above, the present embodiment illustrates a case in which four image output interfaces, i.e., the image output interfaces "0 to 3" 2113, 2151, 2152, and 2153, are provided.

In the present embodiment, printer image processing units "0 to 3" 2115, 2154, 2155, and 2156 are connected to the image output interfaces "0 to 3" 2113, 2151, 2152, and 2153, respectively, to supply synchronization (horizontal synchronization and vertical synchronization) signals and clock signals thereto.

After converting the transferred rectangular data into the raster data, the image output interfaces 2113, 2151, 2152, and 2153 synchronize with the corresponding synchronization signals and the clock signals to output images as video data. The printer image processing units "0 to 3" 2115, 2154, 2155, and 2156 perform correction image processing for printer output and output the result to the printer 2095.

The rendering section 2060 expands PDL code or an intermediate display list into a bitmap image.

A color-space converter 2135 performs color-space conversion on the video (bitmap image) signal 211 input from the rendering section 2060 and outputs the resulting video signal (RGB-color-space raster image data) to the first image ring interface 2147 and a tile generator 2061. The tile generator 2061 converts the video signal (RGB-color-space raster image data) input from the color-space converter 2135 into a plurality of pieces of rectangular image data (RGB-color-space rectangular image data) and outputs the rectangular image data to the system bus bridge 2007 via the second image ring interface 2148.

The CPU 2001 uses the plurality of pieces of rectangular image data (RGB-color-space rectangular image data) to generate data packets, which are described below and shown in FIG. 4, and stores the data packets in the RAM 2002. The CPU 2001 then generates a packet table, which is described below and shown in FIG. 5, and stores the packet table in the RAM 2002.

Reference numeral 2122 indicates a memory control section, which controls the input and output of first and second image memories 2123. Reference numeral 2120 is an external bus interface, which controls communication with an external bus 3.

Figure 3:
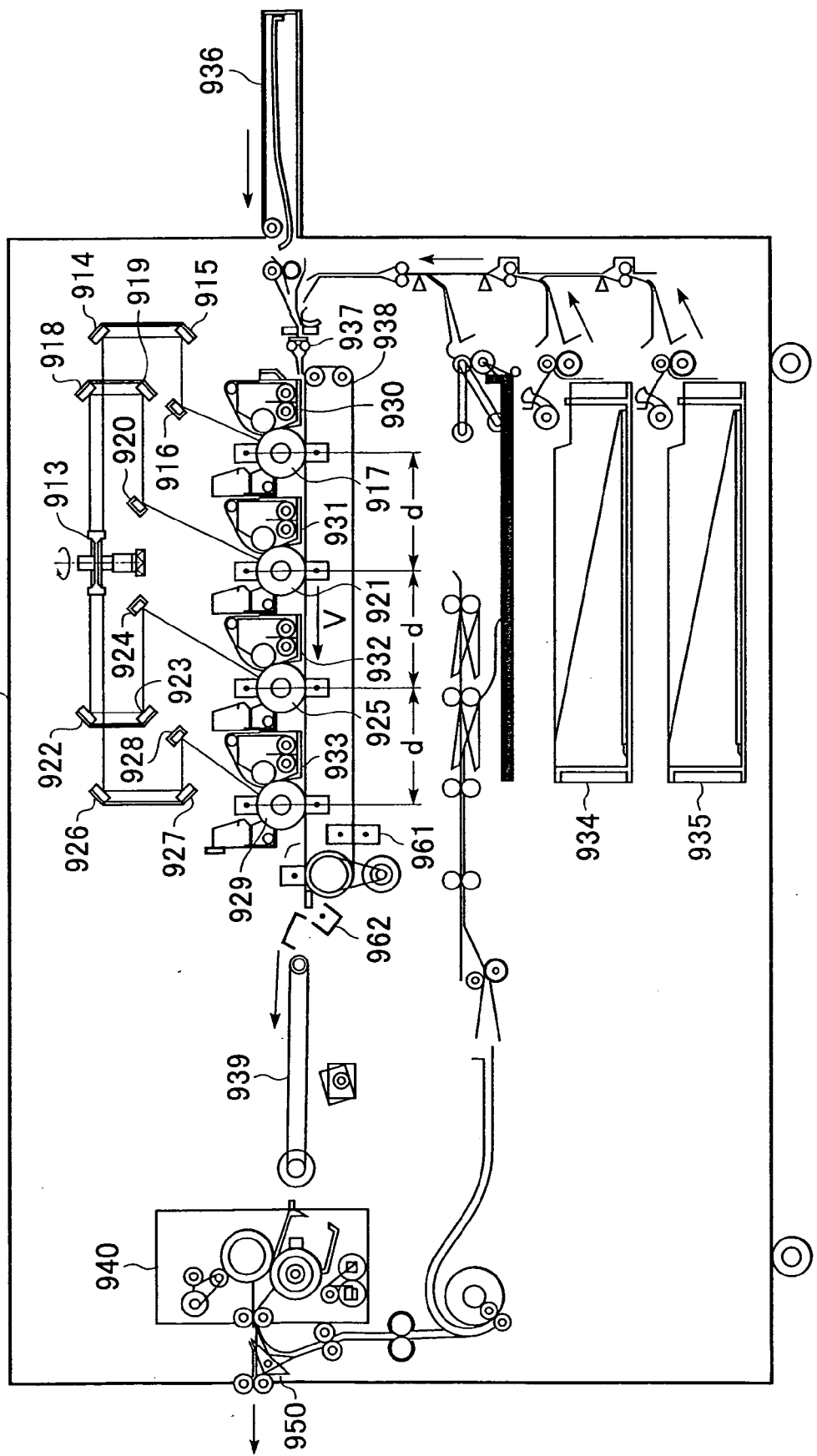
FIG. 3 is a sectional view showing an example of the configuration of the tandem engine printer shown in FIG. 1.

FIG. 3 is a sectional view showing one example of the configuration of the printer (tandem engine printer) 2095 shown in FIG. 2.

In FIG. 3, reference numeral 913 indicates a polygon mirror, which receives four laser beams emitted by four semiconductor lasers (not shown). Of the four laser beams, one scans over a photosensitive drum 917 via mirrors 914, 915, and 916, another scans over a photosensitive drum 921 via mirrors 918, 919, and 920, another scans over a photosensitive drum 925 via mirrors 922, 923, and 924, and the other scans over a photosensitive drum 929 via mirrors 926, 927, and 928.

Meanwhile, a developer unit 930 supplies yellow (Y) toner to form a yellow-toner image on the photosensitive drum 917. A developer unit 931 supplies magenta (M) toner to form a magenta-toner image on the photosensitive drum 921 in accordance with the corresponding laser beam. A developer unit 932 supplies cyan (C) toner to form a cyan-toner image on the photosensitive drum 925 in accordance with the corresponding laser beam. A developer unit 933 supplies black (K) toner to form a black-toner image on the photosensitive drum 929 in accordance with the corresponding laser beam. Images of the four color (Y, M, C, and K) toners are transferred to a sheet, so that an output image in full color can be provided.

The sheet is supplied from one of sheet cassettes 934 and 935 and a manual feed tray 936, and is received and conveyed by a transfer belt 938 via a register roller 937. In synchronization with paper feed timing, the individual color toners are pre-developed on the photosensitive drums 917, 921, 925, and 929, and upon the conveyance of the sheet, the toners are transferred to the sheet.

The sheet to which the color toners have been transferred is released and is conveyed by a conveyor belt 939, and the toners are fused to the sheet by a fuser 940. A flapper 950 temporarily guides the sheet that has passed through the fuser 940 downward, and after the rear end of the sheet comes off the flapper 950, the sheet is turned back for discharge.

By doing this, the sheet is discharged with the face down, resulting in a correct order when sheets are sequentially printed from the front page.

The four photosensitive drums 917, 921, 925, and 929 are arranged at regular intervals by a distance d. The sheet is conveyed by the conveyor belt 939 at a constant speed V, and, in synchronization with the timing of the conveyed sheet, the four semiconductor lasers (not shown) are driven. The semiconductor lasers emit respective laser beams in accordance with video data output at predetermined timings from the printer image processing units "0 to 3" 2115, 2154, 2155, and 2156 shown in FIG. 2.

Although a configuration in which one polygon mirror 913 is used to scan over the photosensitive drums 917, 921, 925, and 929 has been described hereinabove, one polygon mirror may be provided for each photosensitive drum.

Rectangular Data (Packet) Format

In the system controller unit 2000 shown in FIGS. 1 and 2, image data, a command that is issued by the CPU 2001 and that is transmitted to the image processing section 2149, interrupt information that is issued by each block of the image processing section 2149 and that is transmitted to the controlling section 2150, and the like are transferred in the form of packets.

The present embodiment uses three different types of packets, namely, a data packet shown in FIG. 4, a command packet shown in FIG. 6, and an interrupt packet shown in FIG. 7, which are described below.

The individual packets in the image processing apparatus of the present invention will now be described with reference to FIGS. 4 to 7.

Figure 4:
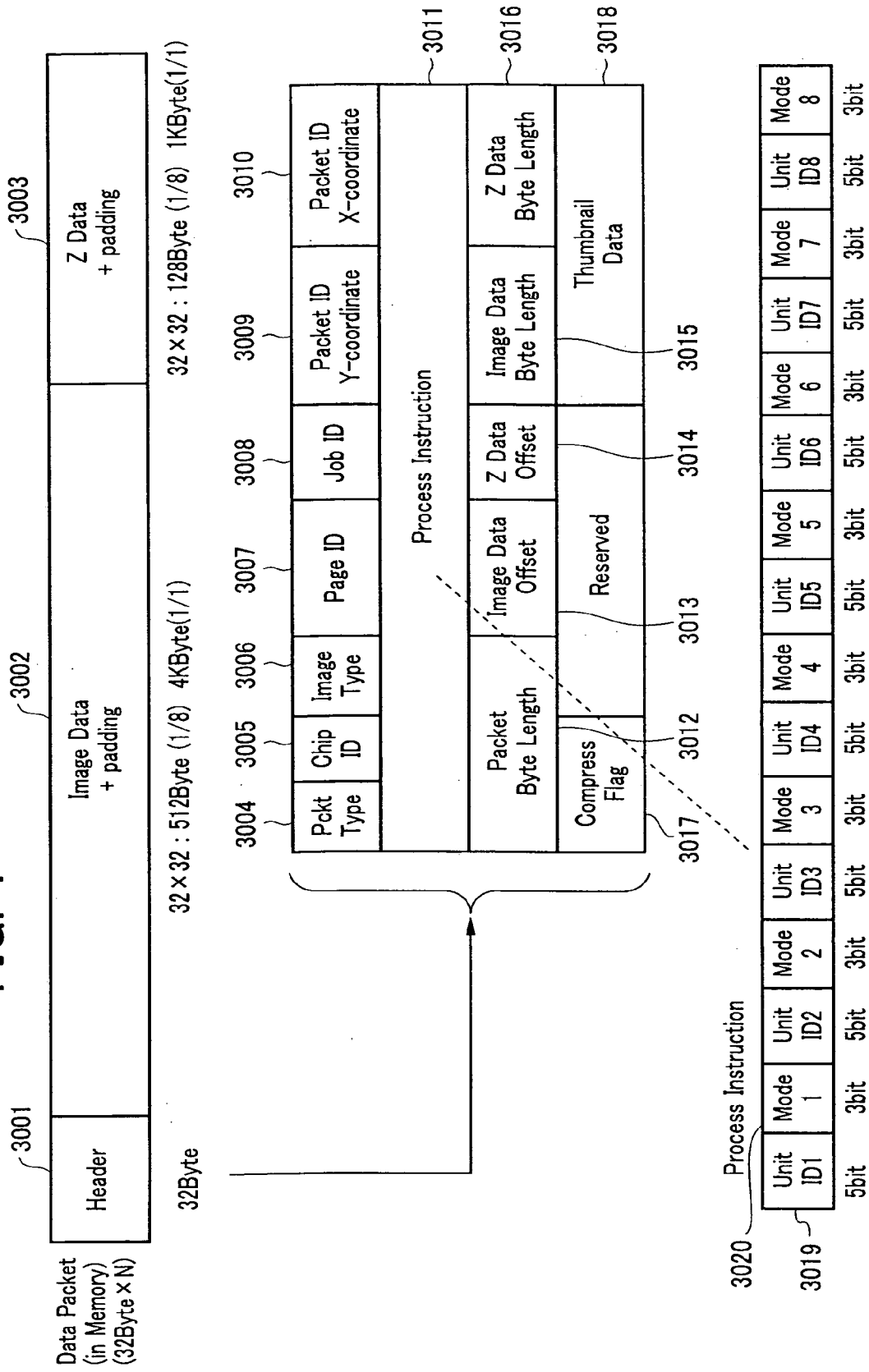
FIG. 4 illustrates one example of the format of a data packet in the image processing apparatus of the present invention.

FIG. 4 shows one example of the format of a data packet in the image processing apparatus of the present invention. This data packet is generated by the CPU 2001 shown in FIG. 1 and is stored in the RAM 2002.

The present embodiment illustrates a case in which image data is processed by being divided into a plurality of pieces of image data 3002, each piece containing one tile image having "128 pixels×128 pixels".

A necessary header information field 3001, an image-appended data (Z data+padding) field 3003, and the like are added to the one-tile image data (image data+padding) 3002 to provide a data packet.

Information contained in the header information field 3001 will now be described.

In the header information field 3001, a packet type field 3004 is used to identify the type of packet and contains a repeat flag, which is not shown. When image data in a data packet is identical to image data in a data packet that is transmitted immediately before, the repeat flag is set.

A chip ID field 3005 indicates a chip ID that serves as a target for packet transmission. A data type field 3006 indicates the type of data. A page ID field 3007 is used to identify a page. Reference numeral 3008 indicates a job ID field in which a job ID for management with software is stored.

Reference numeral 3009 is a tile (packet ID) Y-coordinate field and 3010 is a tile (packet ID) X-coordinate field, and a combination (Yn, Xn) of the tile Y-coordinate and the tile X-coordinate represents a tile number.

Reference numeral 3011 is a process instruction field in which eight sets (8 bits each) of 5-bit unit-IDs "1 to 8" 3019 and 3-bit modes "1 to 8" 3020 are stored. The unit-IDs "1 to 8" 3019 designate corresponding processing units and the modes "1 to 8" 3020 designate operation modes of the processing units. The process instruction field 3011, in which the eight sets of unit IDs and modes are stored, allows one packet to be continuously processed by eight units. This process instruction field 3011 is set from the left in the order of processing, and, after processing, each processing unit shifts the process instruction field 3011 to the left by eight bits.

A packet byte length field 3012 represents the total number of bytes of the packet. An image data offset field 3013 indicates the offset of the image data field 3002 from the start of the packet of and an image-appended information offset (Z data offset) field 3014 indicates the offset of the image-appended information field 3003 from the start of the packet.

An image data byte length field 3015 indicates the number of bytes of the image data field 3002 and an image-appended information byte length (Z data byte length) field 3016 indicates the number of bytes of the image-appended information field 3003.

Image data in the data packet may be compressed or uncompressed. A compress-flag field 3017 is thus used to identify whether the data packet is compressed or uncompressed. The present embodiment illustrates a case in which a JPEG compression algorithm is employed for multivalued color (including multivalued gray scale) data and a PackBits compression algorithm is employed for binary data.

Further, reference numeral 3018 is a thumbnail data field.

Figure 5:
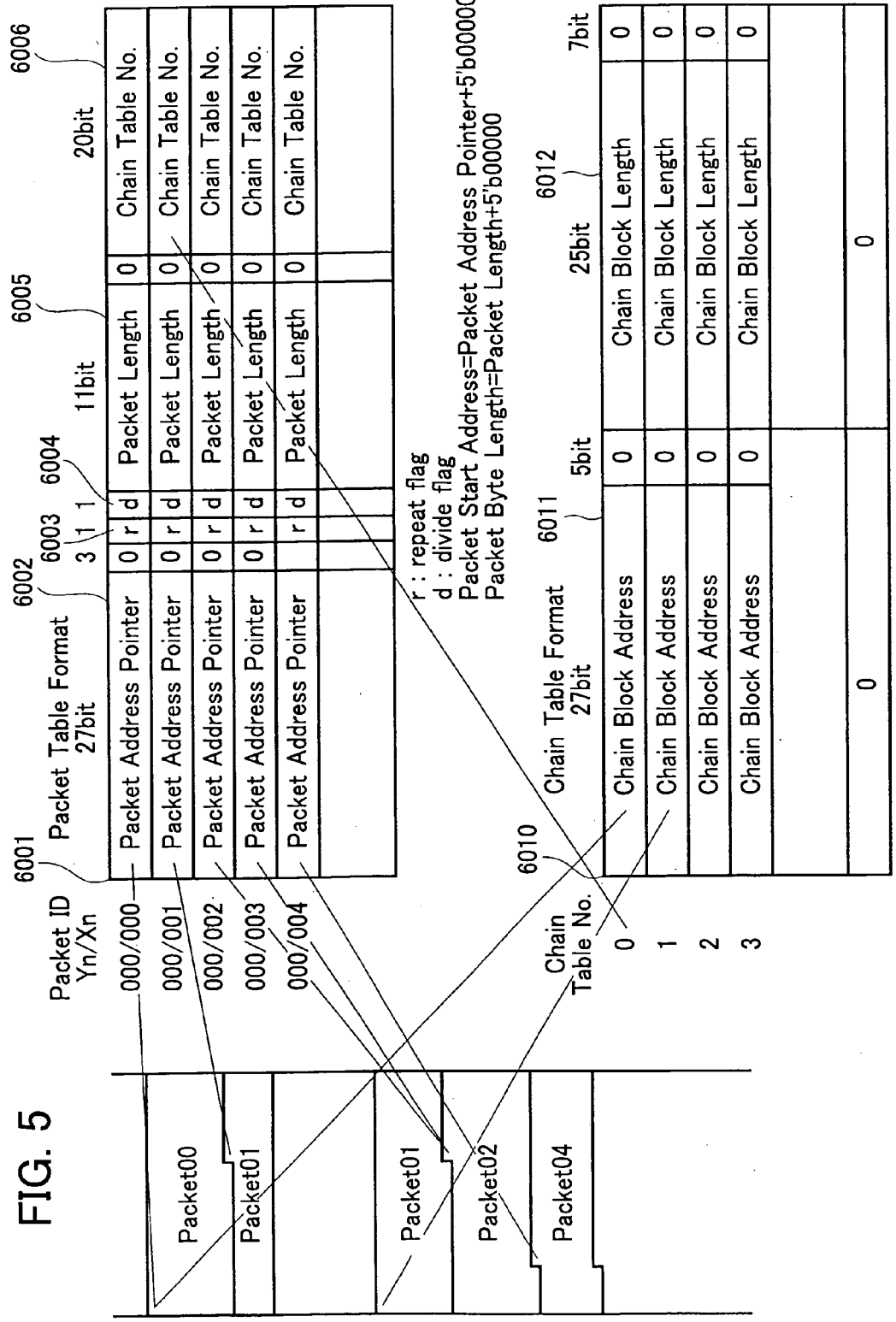
FIG. 5 illustrates one example of a packet table for management of the data packet shown in FIG. 4.

FIG. 5 shows one example of a packet table for management of the data packet shown in FIG. 4. This packet table is generated by the CPU 2001 shown in FIG. 1 and is stored in the RAM 2002.

In FIG. 5, reference numeral 6001 indicates a packet table for management of data packets as shown in FIG. 4.

In the packet table 6001, reference numeral 6002 indicates packet address pointer fields. The addition of five "0" bits to a value stored in the packet address pointer field 6002 (shifting of the value to the left by 5 bits) yields the starting address of an actual packet.

In other words, it is expressed by "packet address pointer 6002 (27 bits)+5b00000=packet starting address".

Reference numeral 6005 indicates packet length fields. The addition of five "0" bits to a value stored in each packet length field 6005 (shifting of the value to the left by 5 bits) yields the total number of bytes of the actual packet.

In other words, it is expressed by "packet length (11 bits)+5b00000=total bytes of packet".

Reference number 6010 indicates a chain table, which is not separated from the packet table 6001.

The packet table 6001 is always arranged in the scanning direction and in the order of (Yn/Xn)=(000/000), (000/001), (000/002), . . . , and so on. Each entry in the packet table 6001 uniquely represents one tile. Also, the next entry of (Yn/Xmax) is (Yn+1/X0).

When a packet has data identical to the data of the previous packet, that packet is not written to memory, but the same information in the packet address pointer field 6002 and the packet length field 6005 as that in the previous entry is stored in an entry of the packet table 6001. Thus, two table entries refer to one packet of data. In this case, the repeat flag 6003 in the second table entry is set.

When a packet is divided into a plurality of segments by chained DMA, a divide flag 6004 is set and a chain table number 6006 of a chain block that contains the starting segment of the packet is set.

The entries of the chain table 6010 are constituted by chain block address fields 6011 and chain block length fields 6012. In each of the chain block address fields 6011 and the chain block length field 6012 in the last entry of the chain table 6010, "0" is stored.

The starting address of an actual chain block is stored in the chain block address 6011. The chain block length field 6012 represents the total number of bytes of the actual chain block.

Figure 6:
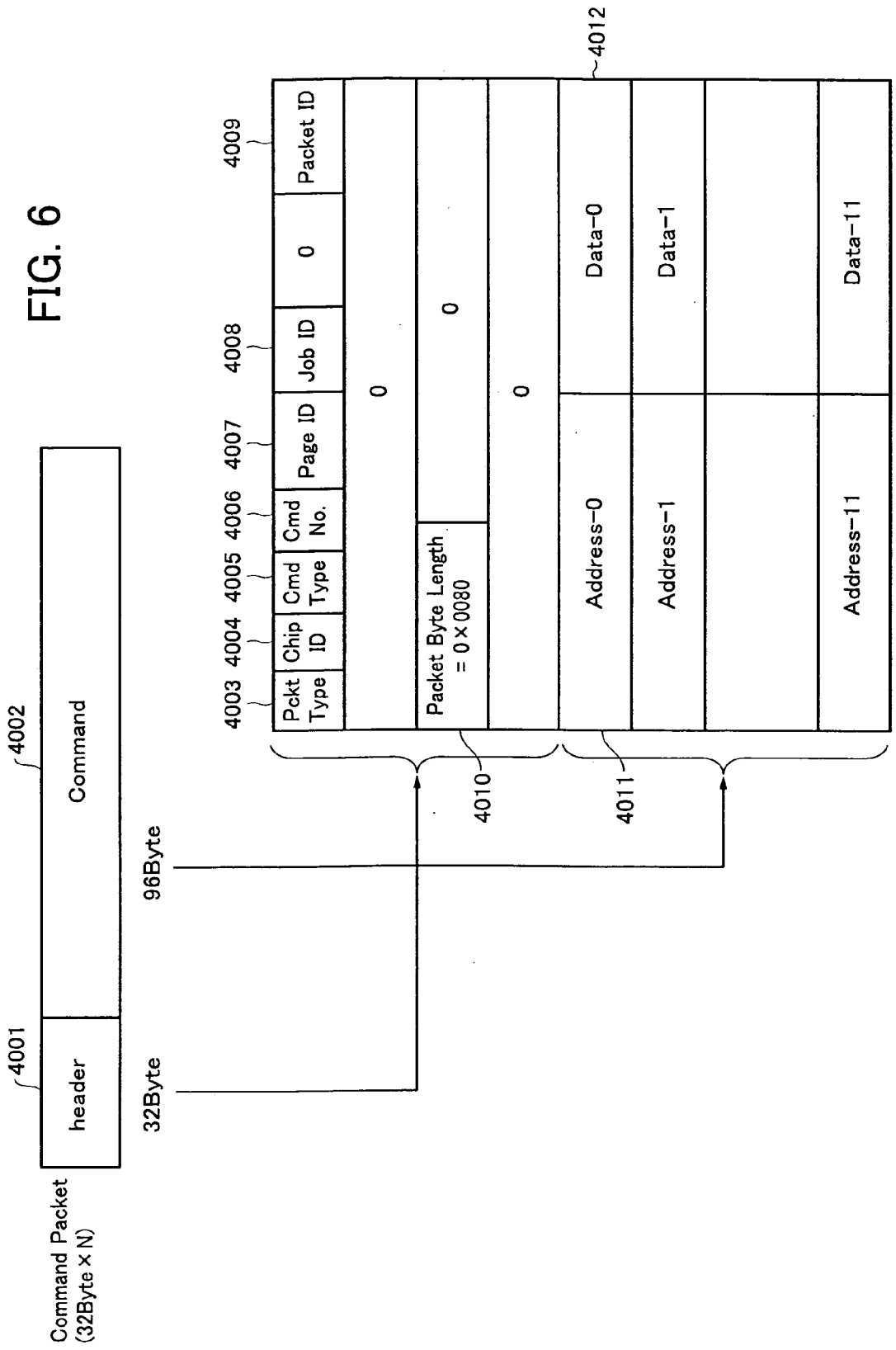
FIG. 6 illustrates one example of the format of a command packet in the image processing apparatus of the present invention.

FIG. 6 illustrates one example of the format of a command packet in the image processing apparatus of the present invention. This command packet is transmitted from the CPU 2001 shown in FIG. 1 to each section of the image processing section 2149. For example, the command packet is used to allow the CPU 2001 shown in FIG. 1 to access the register setting bus 2109 and also to allow the CPU 2001 to access the image memories 2123 shown in FIG. 2.

As shown in FIG. 6, the command packet is constituted by a header information field 4001 and a packet data (command) field 4002.

In the header information field 4001, a reference numeral 4003 is a packet type field, which is used to identify the type of packet. Reference numeral 4004 is a chip ID field, in which an ID representing the image processing section 2149 to which the command packet is transmitted is stored. Reference numeral 4005 is a command type field, in which a command type of writing or reading is stored. Reference numeral 4006 is a command number (Cmd No.) field, in which the number of commands transmitted in this packet is stored.

Reference numeral 4007 is a page ID field, in which a page ID for management with software is stored. Reference numeral 4008 is a job ID field, in which a job ID for management with software is stored.

A packet ID field 4009 is expressed in one dimension and uses only the tile (packet ID) X-coordinate 3010 of the data packet shown in FIG. 2.

A packet byte length field 4010 represents the total number of bytes of the packet and is fixed to 128 (0×0080) bytes.

In the packet data field 4002, reference numeral 4011 indicates address fields and reference numeral 4012 indicates data fields. The packet data field 4002 is capable of storing up to 12 commands, each command being constituted by a set of one address field 4011 and one data field 4012. The number of commands is stored in the command number field 4006 within the header information field 4001.

Figure 7:
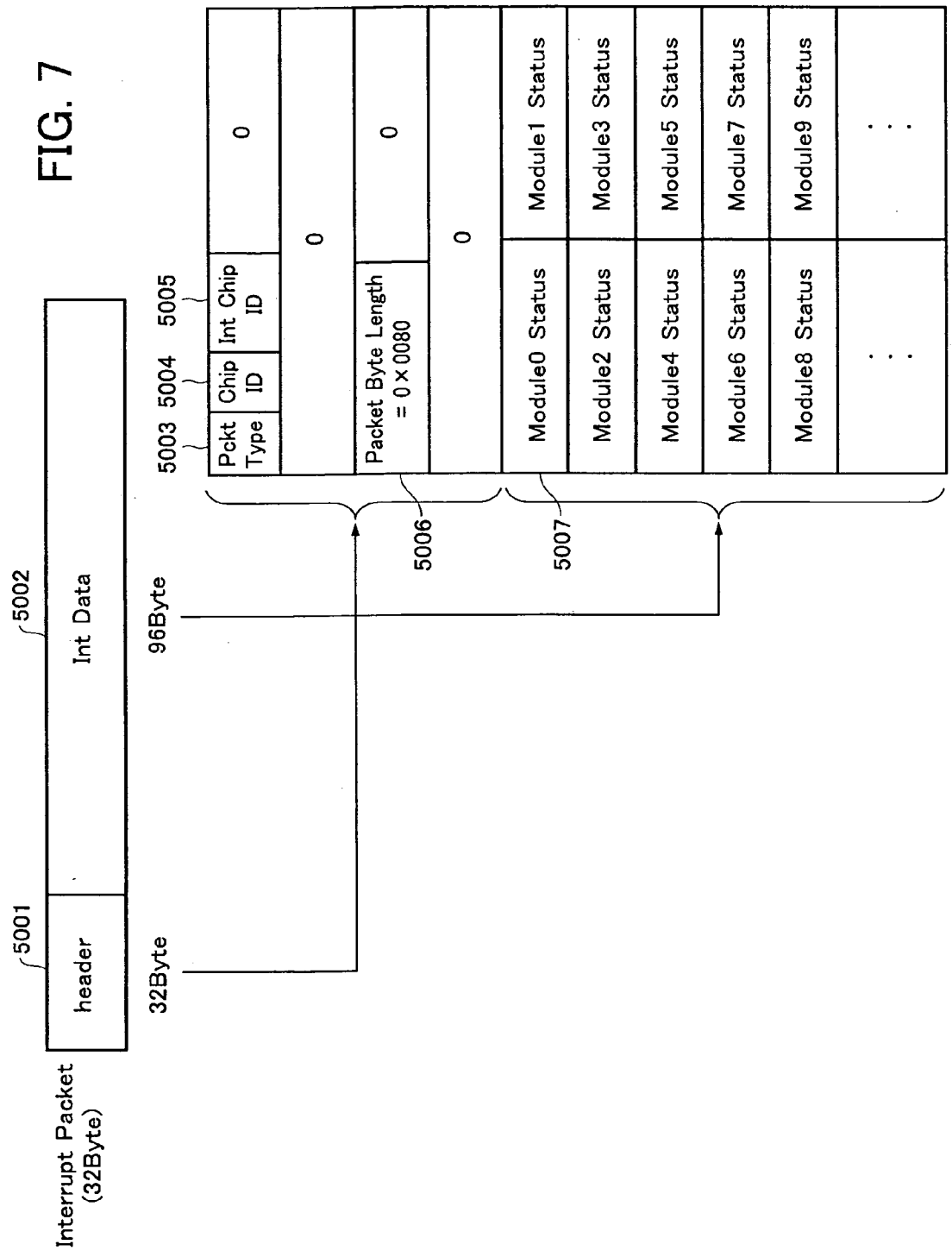
FIG. 7 illustrates one example of the format of an interrupt packet in the image processing apparatus of the present invention.

FIG. 7 illustrates one example of the format of an interrupt packet in the image processing apparatus of the present invention.

This interrupt packet is used to issue an interrupt from an individual section of the image processing section 2149, which is shown in FIG. 2, to the CPU 2001. The status processing section 2105 in the image processing section 2149 is configured such that, upon transmitting an interrupt packet, it does not transmit the next interrupt packet until the transmission thereof is permitted.

As shown in FIG. 7, the interrupt packet is constituted by a header information field 5001 and a packet data (Int Data) field 5002.

In the header information field 5001, a packet type field 5003 is used to identify the type of packet. Reference numeral 5004 is a chip ID field, in which an ID representing the controlling section 2150 to which the interrupt packet is transmitted is stored. Reference numeral 5005 is a chip ID (Int Chip ID) field, in which an ID representing the image processing section 2149 from which the command packet is transmitted is stored.

A packet byte length field 5006 represents the total number of bytes of the packet and is fixed to 128 ((0×0080) bytes.

Status information 5007 of the individual internal modules in the image processing section 2149, which is shown in FIG. 2, is stored in the packet data field 5002. The status processing section 2105 in the image processing section 2149, which is shown in FIG. 2, can collect status information of each module in the image processing section 2149 and can transmit the status information all together to the controlling section 2150.

The image output operation of the multifunctional image processing apparatus of the present invention will now be described with reference to FIG. 8.

Figure 8:
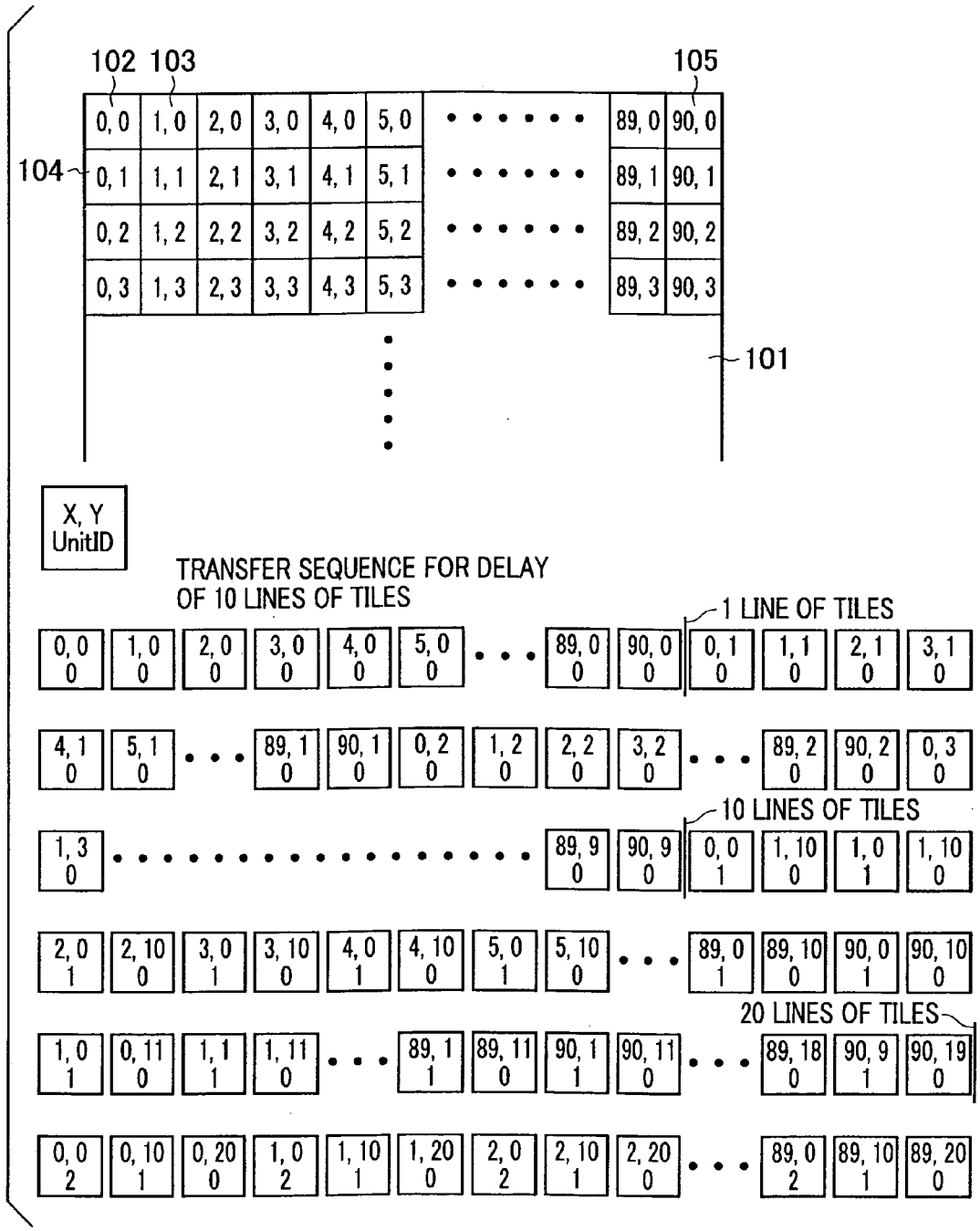
FIG. 8 is a schematic diagram showing an image output sequence of the multifunctional image processing apparatus of the present invention.

FIG. 8 is a schematic diagram showing an image output sequence of the multifunctional image processing apparatus of the present invention. Reference numeral 101 indicates a page, and 102 indicates a first tile, which has tile number (0, 0), in the page 101. Also, a second tile 103 has tile number (1, 0) and the last tile 105 in the first line has tile number (90, 0). Further, the first tile 104 in the second line has tile number (0, 1). Since the printer engine used in the present embodiment has a gap of 100 mm between the photosensitive drums, when "10" lines of tiles are transferred, the front end of a sheet of paper reaches the second-color drum (because the delay of image formation between image forming sections corresponds to 10 lines of tiles). Thus, an example in which the same tile data is retransmitted for every 10 lines of tiles will be described hereinafter. However, timing at which the same tile data is re-transmitted is not limited to every 10 lines of tiles, and, in general, the timing can be expressed by a numeric value that corresponds to the number of lines of tiles corresponding to the distance between photosensitive drums of a printer engine used (i.e., a numeric value that corresponds to the number of lines of tiles corresponding to the delay of image formation between image forming sections). The schematic diagram of FIG. 8 corresponds to an example in which the same tile data is re-transmitted for every 10 lines of tiles.

A packet DMA circuit (not shown) is provided in the first image ring interface 2147. After loading the address of the stored packet table (FIG. 5) in the memory (RAM 2002), the CPU 2001 starts the operation of the packet DMA circuit.

The packet DMA circuit reads a first entry of the packet table from addresses in the packet table set by the CPU 2001 to extract the address of a stored data packet with packet ID (0, 0).

Next, the packet DMA circuit reads the data packet from the address and sends the data packet in which unit ID "0" indicating the image output interface "0" 2113 is preset (added) to the image output interface "0" 2113. In this case, although the description is given of a case in which the CPU 2001 creates the data packet in which unit ID "0" indicating the image output interface "0" 2113 is set (added) as a default value, the packet DMA circuit (not shown) provided in the first image ring interface 2147, instead, may set unit ID "0" during the creation of the data packet.

The data packet is input to the tile decompression sections 2103 via the third image ring interface 2101.

The tile decompression sections 2103 refer to the unit ID, issue a connection request to the image output interface "0" 2113 since the unit ID is "0" for this tile, and transfer tile data to the image output interface "0" 2113. At the same time, the tile decompression sections 2103 send a return packet to the second image ring interface 2148 via the fourth image ring interface 2102.

The image output interface "0" 2113 includes a rectangle-raster conversion circuit (not shown), which expands the tile data (RGB-color-space rectangular image data) into raster data, stores the raster data in the image memories 2123 via the memory bus 2108, and waits for tile data with packet ID (1, 0).

Upon receiving the above-mentioned return packet, the second image ring interface 2148 asserts a packet-transmission permit signal for the packet DMA circuit provided in the first image ring interface 2147.

Subsequently, the packet DMA circuit reads a data packet with packet ID (1, 0) and transfers the data packet via the image ring 2008.

The above processing is repeated, so that data packets are sequentially transferred, and at a point when a packet with packet ID (90, 0) is sent, the transfer for the first line is completed.

When the transfer for the first line is completed, the image output interface "0" 2113 outputs raster image data to the printer image-processing unit "0" 2115 and also asserts a printer-start signal to start the printer 2095.

The printer 2095 that has been started by the printer-start signal outputs a synchronization signal. This synchronization signal is transmitted to the image output interface "0" 2113 via the printer image-processing unit "0" 2115. In turn, the image output interface "0" 2113 synchronizes with the synchronization signal to output a raster image to the printer image-processing unit "0" 2115 for each line.

Then, in the printer image-processing unit "0" 2115, a known color-space conversion circuit creates first-color yellow (Y) image data from the RGM image data, and the printer image processing unit "0" 2115 outputs a video signal (the first-color yellow (Y) image data) to form an image in the first-color yellow (Y).

Further, in parallel to the image formation of the first color, the packet DMA circuit transfers data packets for the second line and, similarly, for up to the tenth line, thereby forming images at the same time.

Also, the CPU 2001 pre-sets a predetermined value ("10" in the present embodiment) in a numeric-value setting register (not shown) provided in the first image ring interface 2147. Upon completing the transfers of data packets for the number of lines corresponding to the value ("10") in the numeric-value setting register, the first image ring interface 2147 reads the same data packet again from the RAM 2002 and sends the data packet to another image output interface with the next unit ID. The arrangement, however, is such that a data packet to be read again and a data packet to be subsequently read are alternately read and alternately transferred.

That is, unlike the conventional example, after the last packet (90, 9) for the tenth line is sent for the first color, a data packet containing the tile data with packet ID (0, 0) is read from the RAM 2002 again in this case, and unit ID "1", which is the ID of the next unit, is added to (set in) the data packet. Then, the resulting data packet is forwarded to the image output interface "1" 2151.

The data packet is transferred to a raster conversion circuit (not shown) in the image output interface "1" 2151, and the tile data in the data packet (RGB-color-space rectangular image data) is expanded into raster data, which is then stored in a different address from the address in which the above-described first-color data is stored in the image memories 2123.

Subsequently, a data packet with packet ID (0, 10) is sent with unit ID "0" and is stored in the image memories 2123 via the image output interface "0" 2113.

Subsequently, a data packet with unit ID "0" and a data packet with unit ID "1" are alternately sent and are stored in different addresses in the image memories 2123 as raster images.

Since the printer engine used in the present embodiment has a gap of 100 mm between photosensitive drums, when data packets for 10 lines of tiles are transferred, the front end of a sheet of paper reaches the second-color drum.

Accordingly, data packets with unit ID "0" and unit ID "1" are transferred to the image output interface "1" 2151, and, at a point of time when the transfer for the first line is completed, raster image data for the second color is output from the image output interface "1" 2151 to the printer image processing unit "1" 2154, thereby changing the color to the second-color cyan (C). Similar processing is also performed for the first color (Y).

Thereafter, a synchronization signal for the second color (C) is transmitted to the image output interface "1" 2151 from the printer 2095 via the printer image processing unit "1" 2154. In turn, the image output interface "1" 2151 synchronizes with the synchronization signal to output a raster image to the printer image processing unit "1" 2154 for each line. Also, similar processing is performed for the first color (Y) and the printer 2095 forms images in the first and second colors at the same time.

Further, the packet DMA circuit in the first image ring interface 2147 sends data packets, and, after sending a data packet with packet ID (90, 19) and unit ID "0", the packet DMA circuit sends a data packet with packet ID (0, 0) and unit ID "2". The data packet is transferred to the image output interface "2" (2152) and the data packet is converted into a raster image in the image memories 2123.

Thereafter, in the present embodiment, the first image ring interface 2147 alternately sends up to four identical data packets, and the image output interfaces "0 to 3" 2113, 2151, 2152, and 2153 convert the data packets into raster images, which are then stored in the image memories 2123. The stored raster images are then transferred to the printer engine of the printer 2095 in accordance with synchronization signals that are synchronized with the corresponding drums of the printer engine having the image forming sections (printer image processing units "0 to 1"). Thus, without the use of an inter-drum delay memory, the printer engine, which has the plurality of image forming sections, performs printing.

In the above processing, in the controller (controller unit 2000) for a multifunction machine, the tile generator 2061 converts an RGB raster image into tile images, which are then stored in the memory (RAM 2002) as tile data; the image output interfaces "0 to 3" convert the tile data into a raster image; and the printer image processing units "0 to 3" perform color-space conversion. According to the present invention, in synchronization with the printer engine of the printer (tandem engine printer) 2095, identical tile data in the memory (RAM 2002) is transferred to the printer engine multiple times. Thus, even for a controller having four drums, it is possible to eliminate the need for an inter-drum delay memory to print an RGB image.

One example of an image output processing sequence of the multifunctional image processing apparatus of the present invention will now be described with reference to the flow chart of FIGS. 9 to 11.

Figure 9:
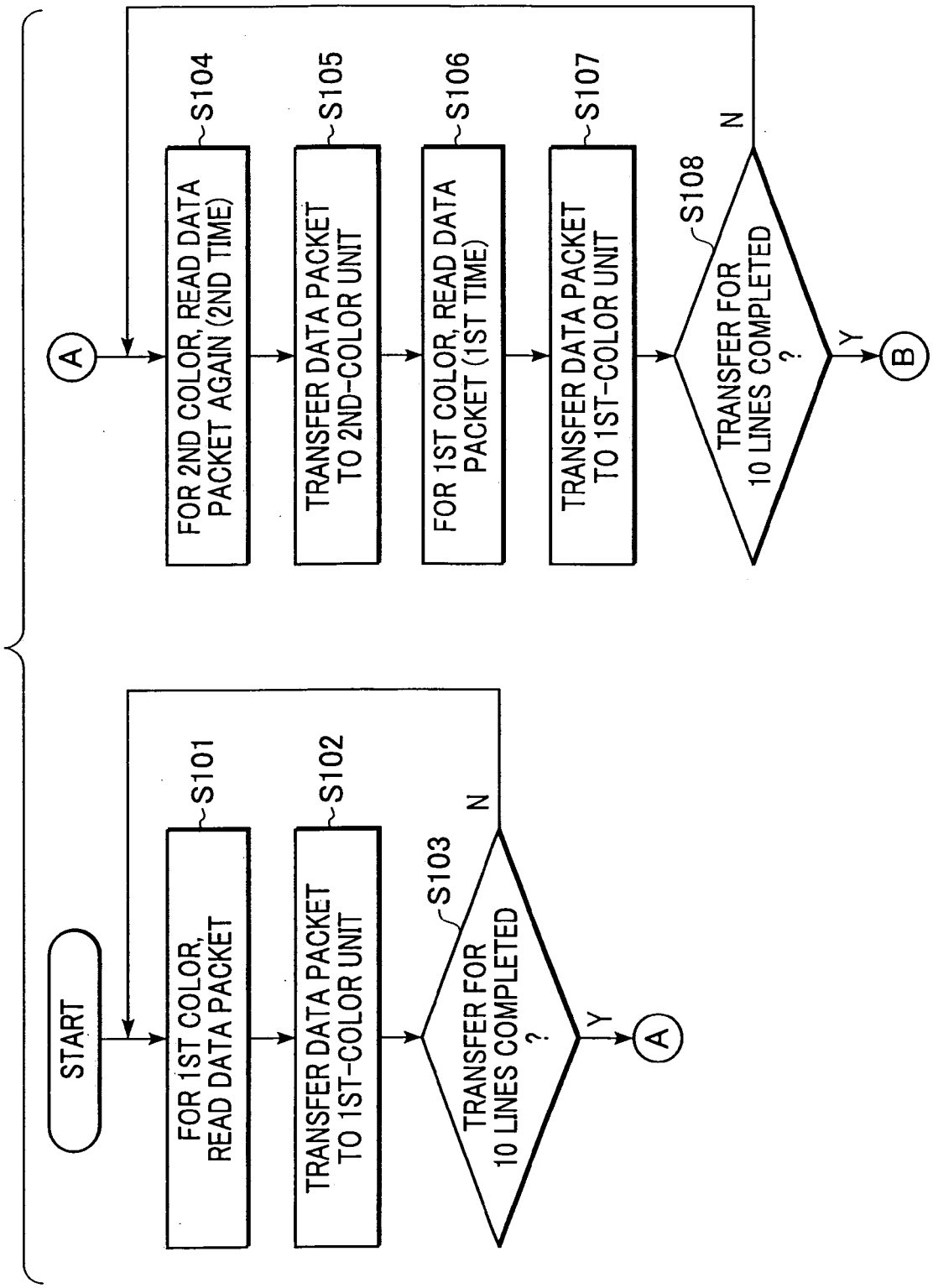
FIG. 9 is a flow chart showing one example of a first control processing sequence of the multifunctional image processing apparatus of the present invention.
Figure 10:
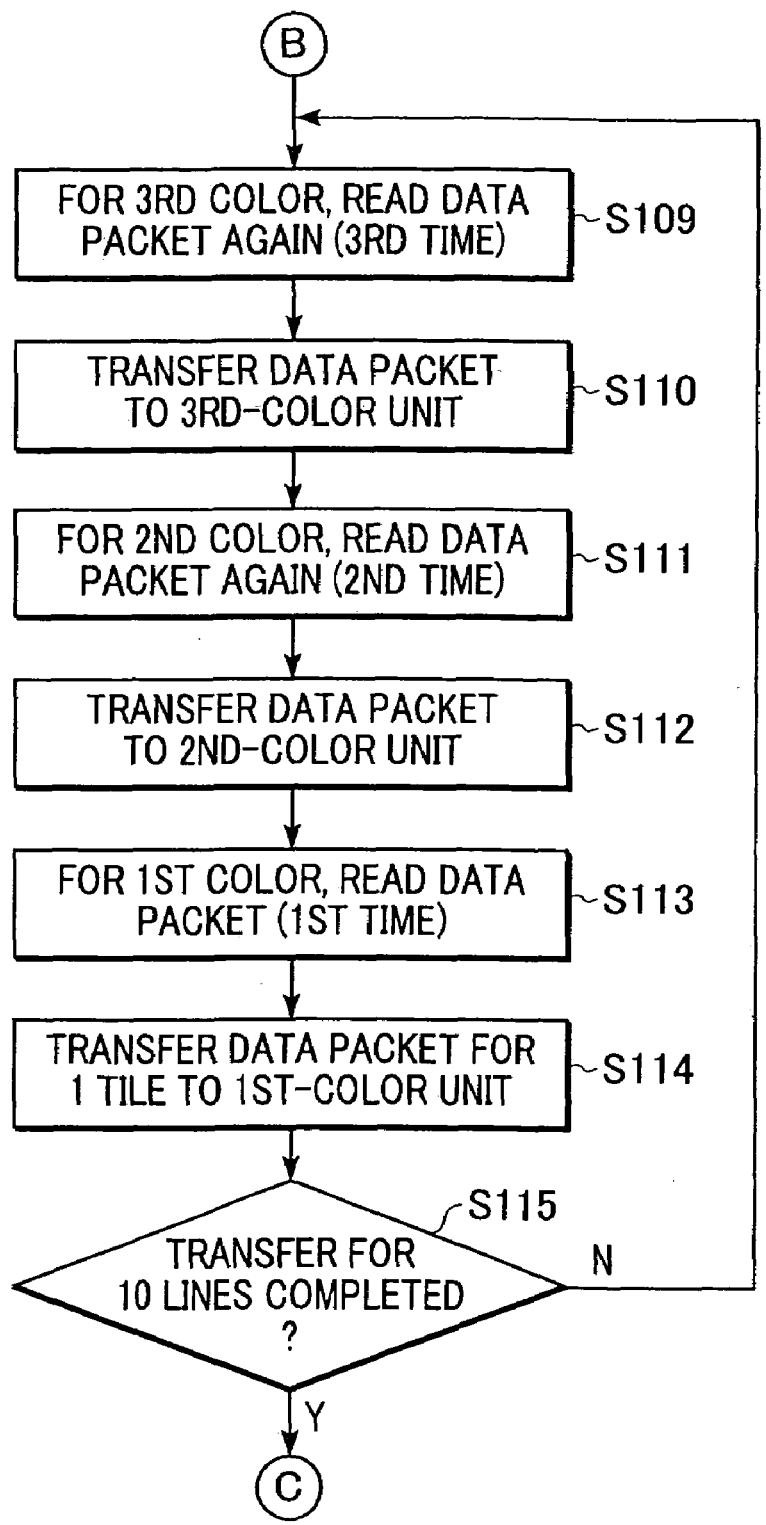
FIG. 10 is a flow chart showing one example of the first control processing sequence of the multifunctional image processing apparatus of the present invention.
Figure 11:
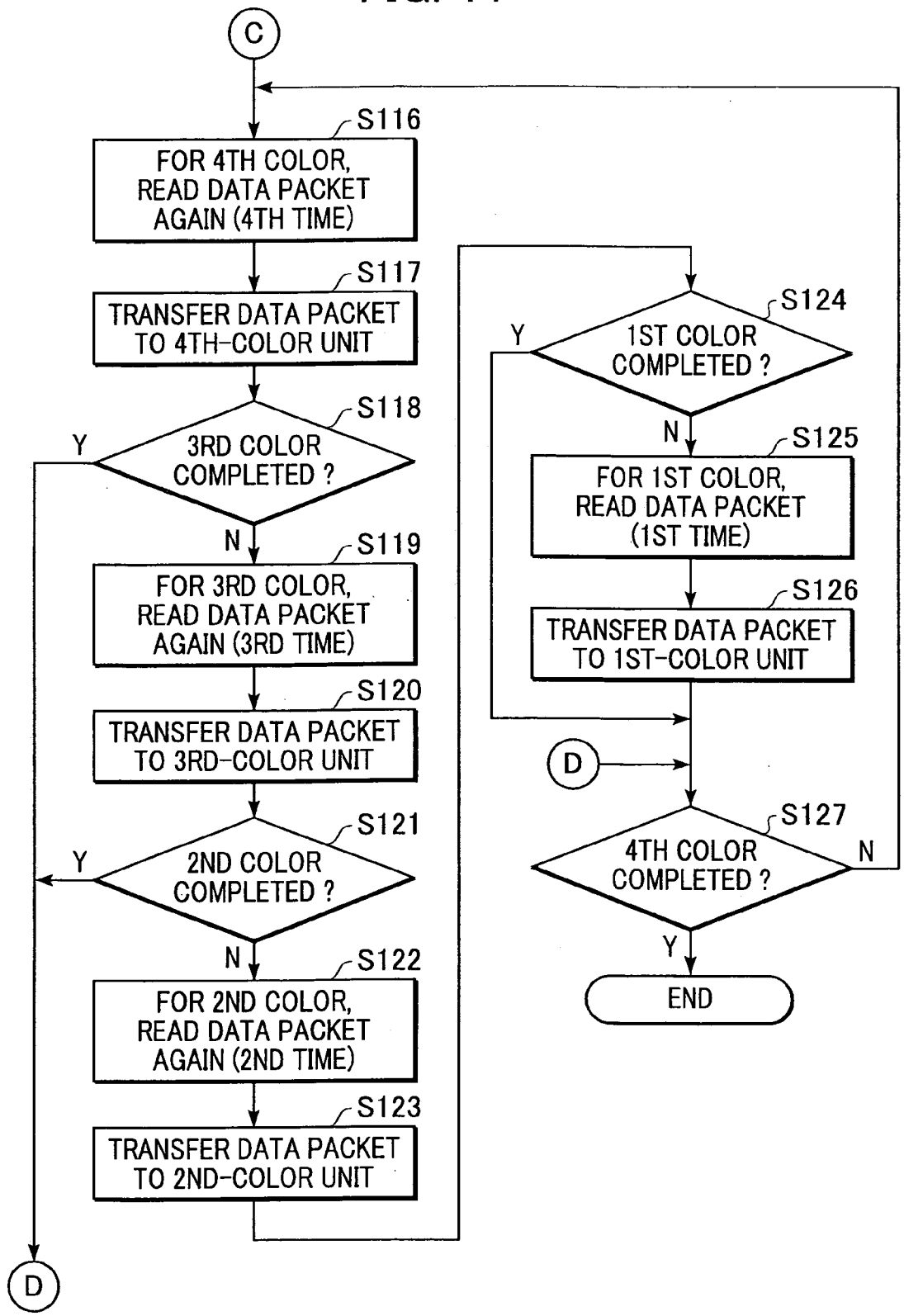
FIG. 11 is a flow chart showing one example of the first control processing sequence in the multifunctional image processing apparatus of the present invention.
Figure 13:
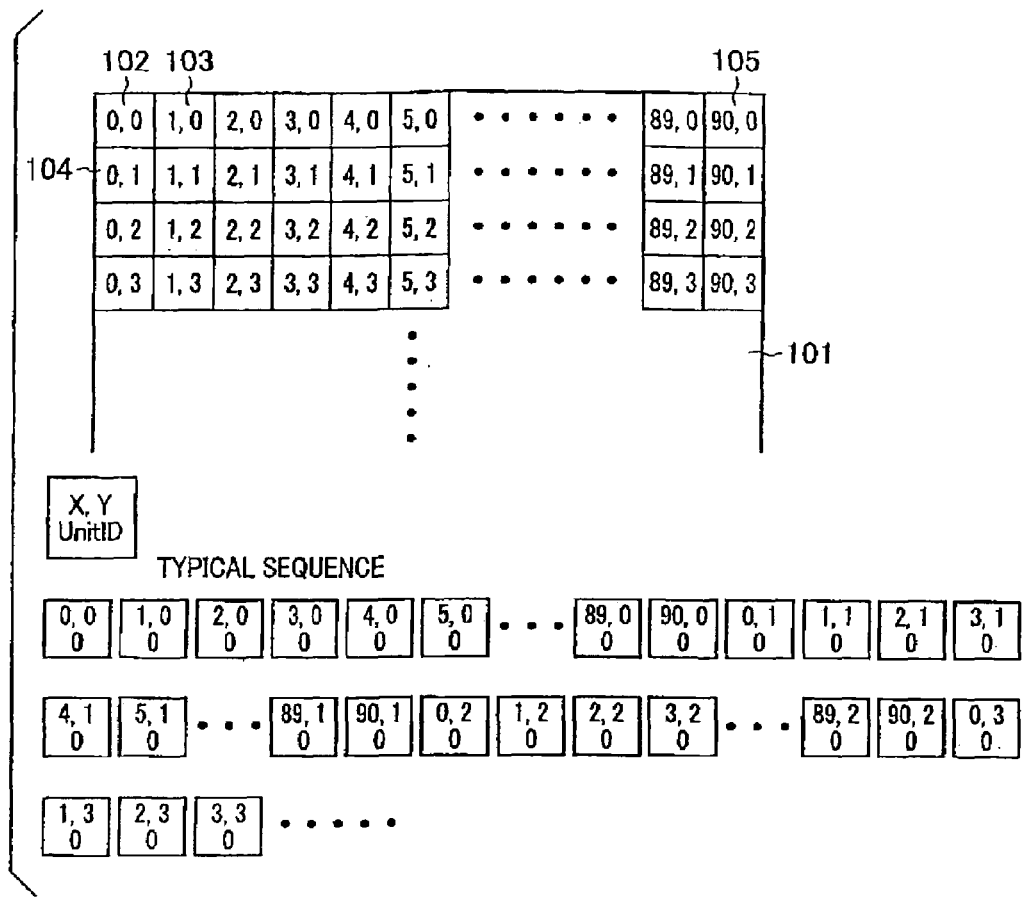
FIG. 13 is schematic diagram showing one example of a rectangular image transfer sequence in a conventional controller for a multifunctional image processing apparatus.

FIGS. 9 to 11 are flow charts showing one example of a first control processing sequence of the multifunctional image processing apparatus of the present invention, the control processing sequence corresponding to an image output processing sequence. The processing in the flow charts is executed by the packet DMA circuit (not shown) provided in the first image ring interface 2147. Also, S101 to S127 represent individual steps.

First, in step S101, a data packet is read for a first color in accordance with a packet table set by the CPU 2001 (first timing reading: a data packet is sequentially read starting from the first entry of the packet table for each loop). In step S102, the data packet read in step S101 is transferred to a first-color unit.

In step S103, a determination is made as to whether the transfers of data packets for ten lines are completed. When it is determined NO, steps S101 and S102 are repeated until the transfers of data packets for ten lines are completed. When it is determined YES in step S103, the process proceeds to step S104.

Next, in step S104, a data packet is read for a second color in accordance with the packet table (second time reading: a data packet is sequentially read starting from the first entry of the packet table again for each loop). In step S105, the data packet read in step S104 is transferred to a second-color unit.

In step S106, a data packet is read for the first color (first time reading: a packet is sequentially read from the entry subsequent to the data packet read in step S101 for each loop). In step S107, the data packet read in step S106 is transferred to the first-color unit:

In step S108, a determination is made as to whether the transfers of data packets for the ten lines are completed for both the first and second colors. When it is determined NO, steps S104 to S107 are repeated until the transfers of data packets for the ten lines are completed. When it is determined YES in step S108, the process proceeds to step S109.

Next, in step S109, a data packet is read for a third color in accordance with the packet table (third time reading: a data packet is sequentially read starting from the first entry of the packet table again for each loop). In step S110, the data packet read in step S109 again is transferred to a third-color unit.

Next, in step S111, one data packet is read for the second color (second time reading: a data packet is sequentially read from the entry subsequent to the data packet read in step S104 for each loop). In step S112, the data packet read in step S111 is transferred to the second-color unit.

In step S113, one data packet is read for the first color (first time reading: a data packet is sequentially read from the entry subsequent to the data packet read in step S106 for each loop). In step S114, the data packet read in step S113 is transferred to the first-color unit.

In step S115, a determination is made as to whether the transfers of data packets for the 10 lines are completed for all the first to third colors. When it is determined NO, steps S109 to S114 are repeated until the transfers of data packets for the 10 lines are completed. When it is determined YES in step S115, the process proceeds to step S116.

Next, in step S116, a data packet is read for a fourth color from the first entry of the packet table (fourth time reading: a data packet is sequentially read starting from the first entry of the packet table again for each loop). In step S117, the data packet that has been read in step S116 again (fourth time reading) is transferred to a fourth-color unit.

Next, in step S118, a determination is made as to whether the transfers of data packets for the third-color are completed. When it is determined NO, in step S119, a data packet is read for the third color (third time reading: a packet is sequentially read from the entry subsequent to the data packet read in step S109 for each loop). In step S120, the data packet that has been read in step S119 again is transferred to the third-color unit. On the other hand, in step S118, when it is determined YES, i.e., it is determined that the transfers of data packets for the third color are completed, the process proceeds directly to step S127.

In step S121, a determination is made as to whether the transfers of data packets for the second color are completed. When it is determined NO, in step S122, one data packet is read for the second color (second time reading: a data packet is sequentially read from the entry subsequent to the data packet read in step S111 for each loop). In step S123, the data packet that has been read in step S122 again is transferred to the second-color unit. On the other hand, in step S121, when it is determined YES, i.e., it is determined that the transfers of data packets for the second color are completed, the process proceeds directly to step S127.

In step S124, a determination is made as to whether the transfers of data packets for the first color are completed. When it is determined NO, in step S125, one data packet is read for the first color (first time reading: a data packet is sequentially read from the entry subsequent to the data packet read in step S113 for each loop). In step S126, the data packet that has been read in step S125 again is transferred to the first-color unit. On the other hand, in step S124, when it is determined YES, i.e., it is determined that the transfers of data packets for the first color are completed, the process proceeds directly to step S127.

In step S127, a determination is made as to whether the transfers of data packets for the fourth color are completed. When it is determined NO, steps S116 to S126 are repeated until the transfers of data packets for the fourth color are completed. When it is determined YES in step S127, i.e., it is determined that the transfers for the fourth color are completed, the process ends.

The individual color units (the image output interfaces "0 to 3") expand tile data (RGB-color-space rectangular image data) contained in the transferred data packets into raster data, store the raster data in the image memories 2123, and wait for the next data packet. The data packets are sequentially transferred, and a unit to which the transfers of data packets for the first line are completed outputs raster image data for each line to the corresponding printer image-processing unit.

In the printer image-processing unit that has received the raster image, a known color-space conversion circuit creates image data in one of YMCK colors from RGB image data. The printer image-processing unit then outputs a video signal (image data for the corresponding color) to the printer 2095, so that the printer 2095 forms an image.

The printer engine used in the present embodiment has a gap of 100 mm (corresponding to 10 lines of tiles) between the photosensitive drums, so that the positions of images in individual colors are displaced by 10 lines of tiles. Thus, pieces of data for individual colors are sequentially sent to the corresponding color units with a delay corresponding to 10 lines of tiles, and the timings at which the images in the individual colors are formed are also delayed by 10 lines of tiles. As a result, the data transfers and the timings of image formation are in phase, which makes it possible to form a multi-color image without color misalignment.

The above-described processing allows tile data to be transferred to the image output interfaces multiple times in synchronization with data-request timings for the corresponding photosensitive drums of a printer engine having a plurality of image forming sections. In addition, the above-described processing makes it possible to provide a multi-function-machine controller for use with a printer engine having a plurality of image forming sections without the use of an inter-drum delay memory, and also makes it possible to provide a multifunction machine, a printer, and the like at low cost.

Although the description in the illustrated embodiment has been given of a configuration in which the packet DMA circuit in the first image ring interface 2147 reads a packet data stored in the RAM 2002 multiple times, as shown in FIGS. 9 to 11, in accordance with a numeric value set by the numeric-value setting register (not shown), the present invention is not limited thereto. For example, the configuration may be such that a program for realizing the processing shown in the flow charts of FIGS. 9 to 11 is stored in a storage medium and the CPU executes the program.

Further, although the description in the above embodiment has been given of the controller unit that outputs image data to the tandem engine printer for forming an image with four colors, namely, yellow (Y), magenta (M), cyan (C), and black (K), the arrangement may be such that image data is output to a tandem engine for forming an image with three colors, namely, yellow (Y), magenta (M), and cyan (C). In this case, the number of times of reading the identical tile image data is three.

The configuration of a data processing program that is readable by the multifunctional image processing apparatus of the present invention will now be described with reference to a memory map shown in FIG. 12.

FIG. 12 illustrates a memory map of a storage medium storing a program for various types of data processing, the program being readable by the multifunctional image processing apparatus according to the present invention.

While not particularly illustrated, the storage medium may also store information for management of a set of programs stored in the storage medium, such as version information and a creator's name, and information that is dependent on the OS (operating system) and the like of a program-reading apparatus, such as icons for identifying the programs and the like.

In addition, data attributed to the various programs is managed in the directory. When a program and/or data to be installed is compressed, a program or the like for decompressing it may also be stored in the storage medium.

The functions shown in FIGS. 9 to 11 in the present embodiment may also be accomplished by a program that is externally installed and that is executed by a host computer. In such a case, the present invention is also applicable to a case in which a set of information containing the program is supplied to an output apparatus from a storage medium, such as a CD-ROM, flash memory, or FD (floppy disk), or an external storage medium over a network.

Needless to say, the above-described object of the present invention can also be achieved by supplying a storage medium storing software-program code for realizing the features of the above-described embodiment to a system or apparatus so that a computer (or CPU or MPU) of the system or the apparatus reads and executes the program code.

In such a case, the program code that is read from the storage medium achieves the novel features of the present invention and the storage medium that stores the program code is also encompassed by the present invention.

Examples of an available storage medium for supplying the program code include a floppy disk, hard disk, optical disk, magnetic optical disk, CD-ROM, CD-R, DVD-ROM, magnetic tape, nonvolatile memory card, ROM, EEPROM, and silicon disk.

Further, not only is the program code that is read from the computer executed to achieve the features of the illustrated embodiment, but also an OS (operating system) or the like that is running on the computer may perform part or all of the actual processing in accordance with an instruction of the program code to achieve the features of the illustrated embodiment. Naturally, such an arrangement is also covered by the present invention.

Additionally, after the program code read from the storage medium is stored in a memory that is provided in a plug-in board inserted into the computer or an expansion unit connected to the computer, a CPU or the like that is provided in the plug-in board or the expansion unit may perform part or all of the actual processing in accordance with an instruction of the program code to achieve the features of the illustrated embodiment. Naturally, such an arrangement is also encompassed by the present invention.

The present invention may also be applied to a system including a plurality of machines or to an apparatus including one machine. Naturally, the present invention is also applicable to a case in which the program is supplied to the system or the apparatus to achieve the features described above. In such a case, the system or the apparatus reads a storage medium that stores the program to be implemented by software for achieving the present invention, thereby allowing the system or the apparatus to offer advantages of the present invention.

In addition, the system or the apparatus may download and read the program to be implemented by software for achieving the present invention from a database on a network through a communication program, thereby allowing the system or the apparatus to offer advantages of the present invention.

As described above, according to the present invention, raster image data for a predetermined space color is converted into rectangular image data and is stored by the storing means, and identical rectangular image data is read predetermined multiple times and is sequentially transferred to the plurality of rectangle-raster converting means for predetermined color components. Thus, in synchronization with data-request timings for the corresponding photosensitive drums of the printer engine having the plurality of image forming sections, tile data (rectangular image data) can be transferred multiple times to the plurality of image output interfaces (rectangle-raster converting means) for the predetermined color components. The present invention, therefore, allows image data to be output in synchronization with data-request timings for the photosensitive drums of the printer engine having the image forming sections, without the use of an expensive inter-drum delay memory that has been conventionally used.

While the present invention has been described with reference to what are presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-forming controller for an image forming apparatus in which a plurality of image forming sections are arranged in parallel for respective predetermined color components to sequentially form images on a recording medium sequentially passing by the image forming sections, the image-forming controller outputting raster image data for the predetermined color components to the corresponding image forming sections, thereby allowing a multi-color image to be formed, the image-forming controller comprising:

raster-rectangle converting means for converting raster image data for a predetermined color-space comprising color components different from the predetermined color components into a plurality of pieces of rectangular image data;

storing means for storing the plurality of pieces of rectangular image data converted by the raster-rectangle converting means;

a plurality of rectangle-raster converting means, provided for the respective predetermined color components, for converting the plurality of pieces of rectangular image data into raster image data;

transferring means for reading identical rectangular image data predetermined multiple times, the identical rectangular image data being stored by the storing means, and for sequentially transferring the read identical rectangular image data to the rectangle-raster converting means; and a plurality of color-space converting means, provided for the respective color components, for converting the raster image data converted by the rectangle-raster converting means into a color-space comprising the predetermined color components to generate respective pieces of raster image data for the predetermined color components and for outputting the pieces of raster image data to the corresponding image forming sections for the predetermined color components.

2. The image-forming controller according to claim 1, wherein the transferring means reads the identical rectangular image data the predetermined multiple times with a delay corresponding to a predetermined number of pieces of data, the identical rectangular image being stored by the storing means, and sequentially transfers the read identical rectangular image data to the corresponding rectangle-raster converting means.

3. The image-forming controller according to claim 2, further comprising numeric-value setting means for setting a numeric value corresponding to the predetermined number of pieces of data, wherein the transferring means reads the identical rectangular image data the predetermined multiple times with a delay corresponding to the number of pieces of data corresponding to the numeric value set by the numeric-value setting means, the identical rectangular image data being stored by the storing means, and sequentially transfers the read identical rectangular image data to the corresponding rectangle-raster converting means.

4. The image-forming controller according to claim 2, wherein the predetermined number of pieces of data is based on an arrangement interval of the image forming sections.

5. The image-forming controller according to claim 3 wherein the predetermined number of pieces of data is based on an arrangement interval of the image forming sections.

6. The image-forming controller according to claim 2, wherein the predetermined number of pieces of data corresponds to a delay of image formation between the image forming sections.

7. The image-forming controller according to claim 3, wherein the predetermined number of pieces of data corresponds to a delay of image formation between the image forming sections.

8. The image-forming controller according to claim 4, wherein the predetermined number of pieces of data corresponds to a delay of image formation between the image forming sections.

9. The image-forming controller according to claim 1, wherein the predetermined color components comprise yellow, magenta, cyan, and black color components or yellow, magenta, and cyan color components, and the predetermined color-space is a color-space comprising red, green, and blue color components, and wherein the color-space converting means converts red, green, and blue color-space raster image data converted by the rectangle-raster converting means into a color-space comprising the predetermined yellow, magenta, cyan, and black color components or the predetermined yellow, magenta, and cyan color components to generate raster image data for the respective predetermined color components and outputs the raster image data to the image forming sections for the predetermined color components.

10. The image-forming controller according to claim 1, further comprising data-packet generating means for generating data packets containing rectangular image data converted by the raster-rectangle converting means, a page identification, a rectangular-image number identification, and a transfer-destination identification indicating one of the rectangle-raster converting means, wherein the storing means stores, as data packets generated by the generating means, the plurality of pieces of rectangular image data converted by the raster-rectangle converting means, and wherein the transferring means reads a data packet containing the identical rectangular image data the predetermined multiple times, the identical rectangular image data stored by the storing means, and sequentially transfers the data packet to the rectangle-raster converting means.

11. A method for an image-forming controller for an image-forming apparatus in which a plurality of image forming sections are arranged in parallel for respective predetermined color components, the image forming sections sequentially forming images on a recording medium sequentially passing by the image forming sections, and the image-forming controller outputting raster image data for each predetermined color component to the image forming sections, thereby allowing a multi-color image to be formed, the image-forming controller comprising raster-rectangle converting means for converting raster image data for a predetermined color-space comprising color components different from the predetermined color components into a plurality of pieces of rectangular image data, storing means for storing the plurality of pieces of rectangular image data converted by the raster-rectangle converting means, a plurality of rectangle-raster converting mean, provided for the respective predetermined color components, for converting the plurality of pieces of rectangular image data into raster image data, and a plurality of color-space converting means, provided for the respective color components, for converting the raster image data converted by the rectangle-raster converting means into a color-space comprising the predetermined color components to generate respective pieces of raster image data for the predetermined color components and for outputting the pieces of raster image data to the corresponding image forming sections for the predetermined color components, the method comprising:

a step of reading identical rectangular image data predetermined multiple times, the identical rectangular image being stored by the storing means, and sequentially transferring the read identical rectangular image data to the rectangle-raster converting means.

12. A computer readable medium storing a computer program, which when executed by a computer, causes the computer to perform the method of claim 11.

* * * * *